United States Patent

[11] 3,594,906

| [72] | Inventor | William H. Kerfoot |
| | | P.O. Box A, Berryville, Va. 22611 |
| [21] | Appl. No. | 15,244 |
| [22] | Filed | Feb. 27, 1970 |
| [45] | Patented | July 27, 1971 |

[54] TRANSPARENT LIQUID LEVEL INDICATOR
1 Claim, 5 Drawing Figs.

[52] U.S. Cl. ..................................................... 33/126.4, 73/425.4
[51] Int. Cl. ........................................................G01f 23/04
[50] Field of Search............................................ 33/126.4; 73/425.4

[56] References Cited
UNITED STATES PATENTS

| 605,146 | 6/1896 | Stokes............................ | 33/126.4 UX |
| 2,257,357 | 9/1941 | Watson......................... | 33/126.4 |
| 2,363,424 | 11/1944 | Keenan.......................... | 33/126.4 X |
| 2,782,514 | 2/1957 | Scott et al...................... | 33/126.4 |

FOREIGN PATENTS

| 394,475 | 11/1908 | France .......................... | 33/126.4 |
| 568,527 | 3/1924 | France .......................... | 33/126.4 |

Primary Examiner—Louis R. Prince
Assistant Examiner—Daniel M. Yasich
Attorney—Lawrence J. Winter ABSTRACT: A transparent liquid level indicator in which a transparent casing is disposed within the tank or reservoir and is provided with a movable plunger. Biasing means normally maintain the plunger in its uppermost position, and when the handle is depressed, the plunger is provided with a piston on the lower end thereof which is depressed or moved downwardly in the casing below an oil or liquid inlet port. The liquid within the tank then enters the casing, and the handle is released so that the biasing means causes the handle to move back to its normal uppermost position and to trap the liquid within the transparent casing. The liquid that is then held or trapped within the transparent casing indicates the level of the liquid in the reservoir when the casing is removed from the reservoir.

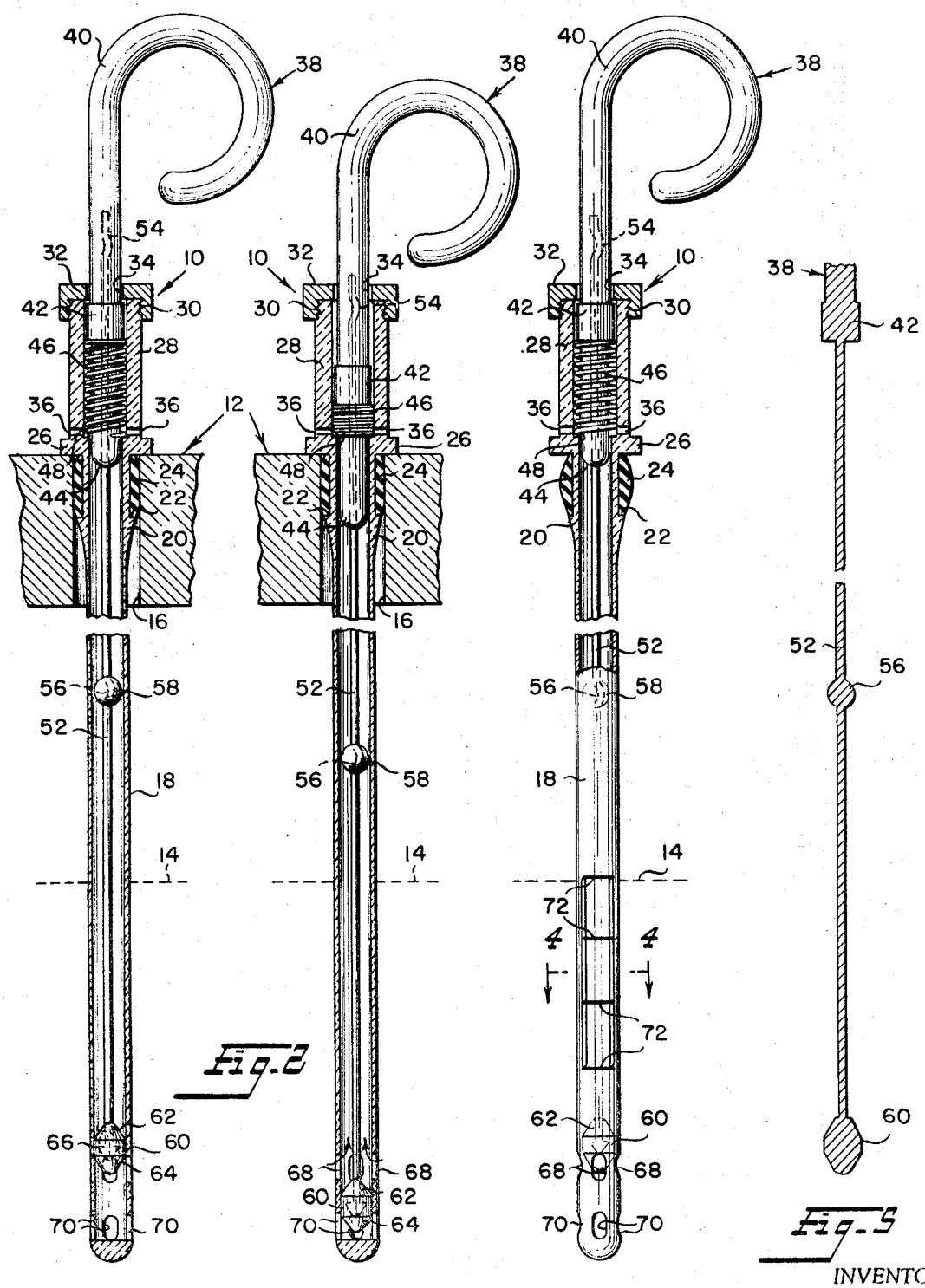

TRANSPARENT LIQUID LEVEL INDICATOR

In accordance with the present invention, a liquid level gage or indicator is provided for indicating the level of oil or the like in the crankcase of an automobile engine, for example, although it is apparent that such use is not intended to limit the scope of the invention, since the liquid level gage of the present invention can also be used to indicate the oil level in a truck, airplane, inboard boat engines, or various other engines.

It is also an object of the present invention to provide a liquid level indicating device that can be used in accurately measuring the level of a liquid in a tank as well as checking the cleanliness and color of any type of fluid in a tank or crankcase, including oil, gas, transmission fluid, and various other types of liquids.

It is a further object of the present invention to provide a transparent liquid level indicator which is simple and economical in construction and the manufacture thereof.

A further object of the present invention is to provide a liquid level measuring device in which it is not necessary to normally wipe off the measuring device, as must be done in the conventional and standard dipstick that is used at the present time in automobiles.

It is still a further object of the present invention to provide a transparent, elongated, hollow casing that can be disposed within a conventional oil filler tank, for example, such as that used in automobiles, and can be used to measure the liquid level of the oil therein, without requiring any extensive changes to the automobiles now in present day use.

It is yet another object of present invention to provide a liquid level indicating device having biasing means for normally positioning the movable plunger of the device in an uppermost position, so that the lower end of the casing is normally out of communication with the liquid level in the tank, and when it is desired to permit the liquid level of the tank to seek its level within the casing, the handle is depressed so that the plunger moves downwardly and opens up the oil inlet ports in the casing to permit the oil to flow therein. Thereafter the handle is released and biasing means return the handle to its normal upright position to trap a sample of the oil in the liquid level indicator casing. Thereafter the indicator device is removed from its position within the interior of the tank being measured, and the transparent casing permits the observer to readily determine the level of the liquid in the tank as well as see the cleanliness of the liquid therein.

Various other objects and advantages of the present invention will be readily apparent from the following detailed description when considered in connection with the accompanying drawing forming a part thereof and in which:

FIG. 1 is a side elevational view of the present embodiment of the invention, illustrating the liquid level indicator in its normal position.

FIG. 2 is a view similar to FIG. 1, but illustrating the handle means of the liquid level indicator depressed so as to permit the ingress of liquid into the transparent casing of the indicator device.

FIG. 3 is a side elevational view of the device after it has been removed from the reservoir for reading the amount of liquid or the liquid level in the reservoir or tank being measured.

FIG. 4 is a cross-sectional view on an enlarged scale taken along the line 4-4 of FIG. 3.

FIG. 5 is a sectional detailed view of the movable plunger embodied in the present invention.

Referring to the drawings, the reference numeral 10 generally designates a transparent liquid level gage or indicator device embodied in the present invention. The indicator device is shown in FIG. 1 disposed within or hanging downwardly into a liquid tank or reservoir having a top 12 and with a liquid level indicated at the dotted line 14 therein. The top 12 of the tank is provided with an opening 16 through which the indicator device extends.

The indicator 10 is provided with an elongated, cylindrical, hollow casing 18 made of plastic material that can withstand the temperatures to which the casing is to be subjected such as oil in an automotive engine. For example, the casing or housing 18 could be made of Lexan which is a clear, flexible plastic material with temperature performance ranges from 50° below to 260° above zero Fahrenheit. Of course the plastic material can be made of other well-known plastic materials that have comparable temperature ranges or suitable temperature ranges for the installation with which it is being used.

The casing 18 is flared outwardly at 20 adjacent its upper end so as to provide an annular shoulder 22 therearound. The shoulder 22 has seated thereon a collarlike tubular ring of increased outer diameter 24. The normal free state of the collar 24 is elliptical as best seen in FIG. 3. The resiliency of this collar member permits it to be inserted within the opening 16 and to form a seal with the tank top, as best seen in FIGS. 1 and 2.

Above the tubular ring 24 is an annular flange 26 which extends well beyond the adjacent edge of the top 12 so as to properly seat the casing or housing and the indicator device on the tank top. The upper end 28 of the casing or housing has an enlarged diameter and is threaded at the top 30 thereof. A complementary threaded cap 32 having a central aperture 34 therein is secured to the threads 30. The lower end of the housing is provided with two oppositely disposed air vents 36 therein adjacent the top of the annular flange 26.

The plunger or piston member of the device is generally indicated at 38 and is provided with a finger-grip handle portion 40 which extends above the upper end 28 of the housing and through the central opening 34. Below the finger-grip handle 40 and within the housing is an enlarged, cylindrical portion or section 42 which engages the underside of the cap 32. Mounted on a reduced cylindrical section 44, disposed just below the enlarged, cylindrical section 42 is a biasing spring or member 46. The lower end of the biasing spring 46 is seated on a shoulder 48 provided adjacent the inner periphery of the annular flange or rim 26.

The biasing spring 46 normally urges the handle 40 in its uppermost position with the enlarged, cylindrical section or portion 42 in an abutting relationship with the under surface of the cap 32.

An elongated, thin shaft 52 is provided in the casing 18 and has a curve or crimp 54. The middle portion of the shaft 52 is also provided with a crimp 56 therein and a spacer member or ball 58 is secured to this crimped portion of the shaft 52 so as to guide it properly in the casing 18. The lower end of the shaft 52 is provided with a round, resilient piston member 60 having conical tapered end portions 62 and 64. The piston member 60 fits snugly within the casing 18 and, while slidable therein, seals against the inner walls of the casing so as to prevent the passage of oil or liquid by the piston member. It is secured to the lower end or tip of the shaft 52 and can be made of rubber, neoprene and the like, and may be provided with an eccentrically formed well therein, so that the piston can be readily snapped on to the end of the bayonet 66 on the end of the shaft 52.

The lower end of the casing 18 is provided with a plurality of circumferentially spaced liquid or oil inlet ports 68. Below these oil inlet ports 68 are another set of similar ports 70.

The shaft 52 is of sufficient length so that when the biasing spring 46 urges the enlarged diameter 42 upwardly against the underside of the cap 32, the piston 60 is disposed above the upper set of the oil or liquid ports 68, as best seen in FIG 1. At this time it will be noted that the interior of the casing 18 above the piston 60 is closed off from communication with the liquid within the tank or reservoir.

In operation, when it is desired to measure the liquid level within the tank or reservoir, the device is moved from the position shown in FIG. 1, which is its normal position, at which time the handle 40 and the shaft 52 are held in their up position by the biasing spring 46, to the position shown in FIG. 2. When it is desired to measure the liquid level, the handle is grasped between the forefinger and the thumb and is pushed downwardly or depressed to the position shown in FIG. 2. This causes the piston 60 to move below the oil or liquid inlet ports 68 so that the liquid may enter the ports 68 and seek the level of the liquid level line 14 in the tank or reservoir. Any liquid that is in the casing 18 and below the piston 60 will be forced out of the oil ports 70 below the piston as clearly shown in FIG. 2. The handle 40 is maintained in a depressed condition for several seconds so that the oil can enter the ports 68 and properly fill the interior of the casing to the true liquid level of the tank. Thereafter downward pressure on the handle 40 is released and the spring 46 returns to the uppermost position as shown in FIG. 3 at which time the piston 60 is also raised or moves upwardly in the casing 18 to the position shown in FIGS. 1 and 3 above the oil ports 68 so as to seal off the interior of the casing 18 above the piston 60.

Thereafter the device is withdrawn from the opening 16 by grasping the handle 40 and pulling it and the device is completely removed from the tank. Then the observer looks through the transparent casing 18 and the liquid level is clearly apparent within the casing 18, and the calibrations 72 on the lower portion of the casing 18 are clearly marked to indicate whether the oil, for example, within the automotive engine has to be refilled or whether the oil level in the tank is at the proper operating level.

From the foregoing description, it is apparent that the present invention provides a simple compression coil spring in the device which holds the handle in the up position at all times except when downward pressure is exerted on the handle.

It is also apparent that the present device is provided with a simple ball member that moves with the shaft of the device during operation and acts as a guide means and prevents inadvertent jamming or undue wear of the device and keeps the shaft centered.

It is also apparent that the present invention provides a device that can be operated with one hand using the same motions and the same grip which the public is so accustomed to using in the operation of a typical, conventional oil stick now in use.

The present invention further provides spring means that are always under a sufficient means of compression to prevent the casing from withdrawing prior to the enlarged, cylindrical section engaging in the withdrawal operation.

The present device also provides a spring means which offers assistance to pulling up on the handle while at the same time exerting a downward pressure on the main casing to maintain it fully inserted until the enlarged, cylindrical section engages the cap in the act of withdrawal.

The present invention further provides a novel and highly flexible member for indicating the liquid level of an automobile or the like of any vintage.

The present invention further employs a flexible slender shaft member within a flexible casing or tube which actuates a resilient and pliable piston member whose midriff is under sufficient compression to assure a proper seal with the inner surface or wall of the transparent casing.

The present invention further provides an indicator device in which the handle is first depressed to assure complete insertion, and it is then withdrawn in one single motion with the familiar forefinger and thumb grip used on conventional dipsticks. Once withdrawn, the present device is self-sealing due to the upward pressure on the slidable plunger or shaft maintained by the spring member.

Inasmuch as various changes may be made in the relative arrangement, form and location of the parts without departing from the spirit and scope of the invention, it is not meant to limit the invention except by the appended claims.

What I claim is:

1. An indicator and sampling device comprising an elongated transparent plastic casing open at the top, said casing having a thin wall lower cylindrical portion and an upper thick walled cylindrical portion, said upper cylindrical portion being of substantially larger diameter than said lower portion, said lower portion having an outwardly flared portion adjacent its upper end, forming an annular shoulder therearound, said upper portion having an annular flange adjacent its lower end in vertical-spaced relationship with said annular shoulder, a collarlike resilient tubular ring having a normal elliptical configuration disposed in the space between said flange and shoulder, a threaded plastic cap member secured to said casing and having a central opening therein, said casing having vertical spaced oil inlet and oil outlet ports in the lower end of said lower cylindrical portion, a plunger member having an enlarged cylindrical section disposed in said casing comprising a shaft with a crimp therein, a ball guide secured on said crimp, a slidable resilient piston having conical tapered end portions secured to the lower tip of said shaft to seal against the inner surface of said lower cylindrical section, the upper end of said shaft disposed in said upper thick-walled cylindrical section, a reduced cylindrical plunger section disposed below said enlarged cylindrical section, a spring member disposed around said reduced cylindrical section and seated on an inwardly projecting portion of said annular flange and bearing against the lower end of said enlarged cylindrical section to normally force it upwardly, another reduced cylindrical finger grip section disposed above said enlarged section and extending through said central opening and curved back upon itself to form a loop for gripping the device, air vent means in the lower sides of said thick-walled cylindrical portion, said piston being disposed above the uppermost oil inlet ports when said spring member maintains said enlarged section in its uppermost position and below said oil inlet ports when said spring is depressed.